United States Patent [19]

Wolf

[11] Patent Number: 5,088,204
[45] Date of Patent: Feb. 18, 1992

[54] LEVEL SENSING UNIT AND A LEVEL INDICATING DEVICE BASED THEREON

[76] Inventor: Kenneth E. Wolf, 995 Sheridan, Wauconda, Ill. 60084

[21] Appl. No.: 603,563

[22] Filed: Oct. 25, 1990

[51] Int. Cl.⁵ ............................................. G01C 9/06
[52] U.S. Cl. ........................................ 33/366; 33/396; 33/378
[58] Field of Search ............. 33/366, 378, 396; 340/689; 200/61.52, 61.48, 84 R, 61.45 R

[56] References Cited

U.S. PATENT DOCUMENTS

| | | | |
|---|---|---|---|
| 2,789,362 | 4/1957 | Maroth | 33/366 |
| 3,660,840 | 5/1972 | Plofchan | 33/366 |
| 3,791,042 | 2/1974 | Bell | 33/366 |
| 4,096,638 | 6/1978 | Schimming | 33/378 |
| 4,152,839 | 5/1979 | McDonald | 33/366 |
| 4,507,965 | 4/1985 | Stratton et al. | 33/366 |
| 4,571,844 | 2/1986 | Komasaku et al. | 33/366 |
| 4,685,218 | 8/1987 | Wolf | 33/366 |
| 4,760,649 | 8/1988 | Preston et al. | 33/366 |
| 4,876,799 | 10/1989 | Wolf | 33/366 |
| 4,887,359 | 12/1989 | Hofius | 33/366 |
| 4,943,158 | 7/1990 | Pertl et al. | 33/366 |

FOREIGN PATENT DOCUMENTS 2510252  1/1983  France ................. 33/396

*Primary Examiner*—Thomas B. Will
*Attorney, Agent, or Firm*—Eugene I. Snyder

[57] ABSTRACT

A level sensing unit, designed to be incorporated in a carpenter's level, is relatively insensitive to the expansion and contraction of the buoyant fluid, independent of the specific gravity of the fluid, and virtually free of oscillations accompanying a change in liquid orientation. The device can be constructed inexpensively of commonly available materials. The device has a float with an electrically conducting plate bisecting the float between its ends and is pivotally mounted on pins protruding from walls of a sealed housing. Adjacent to the opposing surfaces of the plate are two electrically conducting strips. At level neither strip contacts the nearest surface of the plate, but when the unit is not at level one or the other strip makes physical and electrical contact.

7 Claims, 5 Drawing Sheets

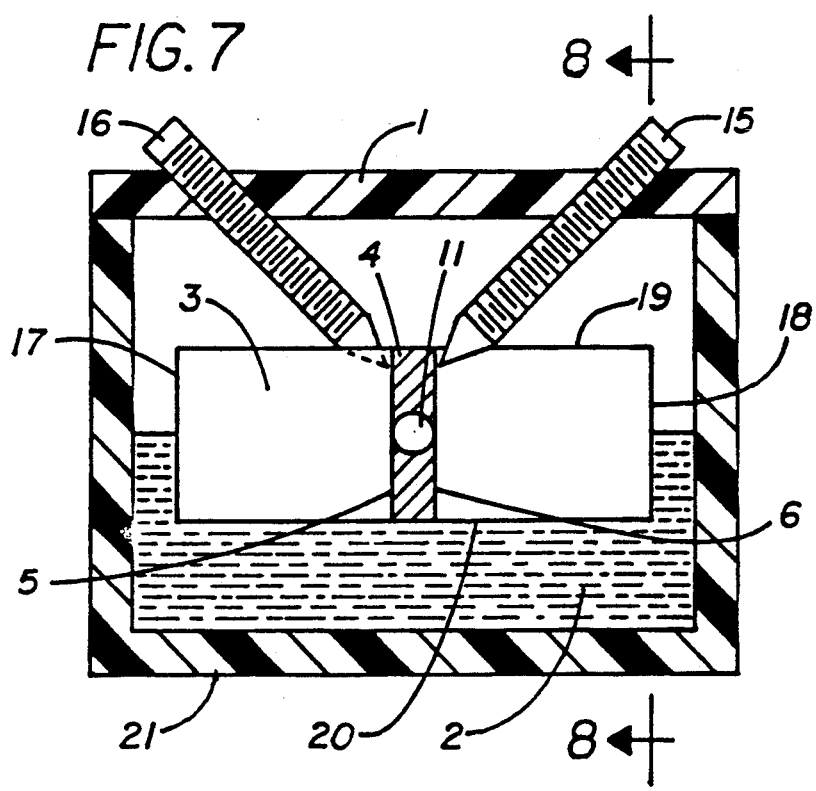
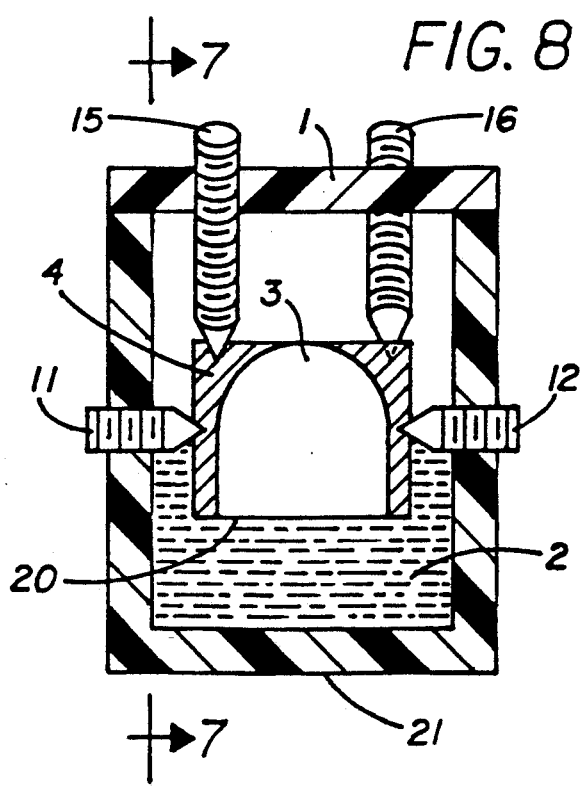

LEVEL SENSING UNIT AND A LEVEL INDICATING DEVICE BASED THEREON

BACKGROUND OF THE INVENTION

Virtually from the beginning of recorded history man has required the means to determine true horizontal and vertical in major construction of all types. This need has continued undiminished to the present time, and in fact the primitive carpenter's level has persevered virtually uncharged for many years. In such a level a vial or generally cylindrical container is partially filled with a liquid so a bubble of air remains. When the vial is place horizontally on a level surface i.e., when the axis of the vial is coparallel with the local horizon, the bubble will be equidistant from the ends of the cylinder, i.e., it will be centered. Any deviation from level will be manifested by deviations of the bubble from centrality, i.e., it will be closer to one end than the other. In this application, horizontal level will mean a line coparallel to the local horizon, and vertical level will mean a line perpendicular to the local horizon.

The classical bubble level has limitations in accuracy as well as convenience. Because it relies on visual sighting when used in, e.g., carpentry the user's eyes may need to continually shift between the level and the focus of his work, such as the end of a beam. Consequently, there is a need for a level which can be used by one person without attendant constant close eye contact. It is desirable that such a level be responsive, both in the sense of a rapid response time to changes in horizontal position, and in the sense of having the capability of detecting small deviations from absolute level. Additionally it is paramount that such a level be sturdy, inexpensive, simple to manufacture, and convenient to use under extremes of field conditions such as temperature, humidity, and cramped work space.

Although there are examples of levels and level sensing units based on electroptical devices capable of great precision and accuracy such articles are excluded from further consideration here because of their cost and sometimes because of their inconvenience in operation. The construction worker, for example, needs a much simpler device. Perhaps the best example of an attempt to fill this need is that described in U.S. Pat. No. 4,152,839, which utilizes a sealed capsule containing a bead of mercury which acts much like an air bubble in a vial of liquid. When in a horizontal level position mercury, an electrical conductor, is at the center and in electrical contact with electrodes which energize a current indicating a level status, e.g., a buzzer or bulb. When in a position deviating from horizontal the bead of mercury tends to roll away from the center, breaking electrical contact and deenergizing the circuit. The many possible variations of this theme need not be elaborated on at this time.

The above design is essentially a mercury-actuated switch. An acknowledged limitation of such a switch is its relatively sluggish response and insensitivity to small changes, both arising because the extremely high surface tension of mercury requires a relatively large degree of angular change from level for movement of the mercury bead. Although somewhat of an exaggeration, it is almost as if such a mercury-actuated switch exhibits a step response rather than a continual one to changes in angular position of the mercury-containing capsule.

In U.S. Pat. No. 4,685,218 I have devised a simple but accurate level sensing unit with a rapid response time and which can readily drive or be incorporated into an electrical circuit indicating the state of level. The level sensing unit is easily incorporated into, for example, a contractor's level to afford a device which is significantly advantageous relative to prior art levels. As significant as is the advance presented by this level sensing unit, nonetheless certain improvements were judged to be desirable. One goal was to reduce the sensitivity of operation of the level to expansion and contraction of the liquid exerting a buoyant force on floats connected to electrical contacts. A second goal was to make the operation virtually independent of the specific gravity of the liquid providing the buoyant force, and preferably to make a level sensing unit operate effectively with a buoyant liquid of specific gravity of about 1 or even less. Although the prior art level sensing unit worked even with a liquid of specific gravity near 1, it operated best when the specific gravity was at least 1.5. Another goal was to further improve the response of the unit to changes in liquid orientation. Thus, perturbations in liquid orientation imparted some tendency to the float of the prior liquid sensing unit to oscillate like a pendulum.

Upon considering this wish list of improvements it occurred to me that all could be achieved if the unit bearing the moving contacts was on an axis so that the resulting torque about the axis was zero regardless of the unit's orientation. Contemplation of this wish list of improvements resulted in U.S. Pat. No. 4,876,799, which achieved the desired outcome by having that portion of the unit bearing the moving contacts be on an axis such that the unit's pivot points were coincident with an axis with respect to which the unit has a zero moment of inertia. Such a requirement is equivalent to every plane intersecting and normal to the axis coincident with the pivot points (or axle) being symmetric with respect to inversion about the point of intersection. With such an arrangement motion about the axle is unattended by oscillation. If the unit has the same symmetry along a second axis normal to the first axis mentioned above then it also will be relatively insensitive to the contraction and expansion of the liquid exerting the buoyant force and to the specific gravity of the liquid.

Further simplification is possible without degrading performance, and this application describes yet another approach, utilizing different symmetry properties, which exhibits high accuracy and sensitivity and good reproducibility while retaining simplicity of construction and operation.

SUMMARY OF THE INVENTION

The purpose of this invention is to make a level sensing unit which is inexpensive, reliable, and easy to incorporate into a contractor's level while making it sensitive to small deviations from level with a rapid response to angular changes, insensitive to the expansion and contraction of the liquid exerting a buoyant force, and relatively free from oscillations. An embodiment is a float which exhibits bilateral symmetry pivoting about its midpoint, which has a plate inserted in the float in that plane with respect to which the float exhibits bilateral symmetry, and which is placed in a sealed housing having two electrical strips adjacent to and equidistant from the two opposing surfaces of the plate. A more general embodiment can be expressed solely in terms of bodies having certain symmetry.

DESCRIPTION OF THE FIGURES

FIG. 7 is a front cross sectional view of a fourth illustrative embodiment of a level sensing unit.

FIG. 8 is a view along 8—8 of FIG. 7.

DESCRIPTION OF THE INVENTION

The level sensing unit which is my invention is capable of many design variations which are a matter of choice to one skilled in this art. The detailed description which follows often will indicate some of the possible variations, yet for ease of exposition and understanding the description most usually will be couched in terms of just the embodiments incorporated in the figures. Yet it must be clearly understood and emphasized that the figures represent only several of a large number of possible embodiments of an invention all of whose embodiments reside in the invention as claimed.

The level sensing unit comprises a sealed housing, 1, which most generally will be box-like in shape, as in the figures. Because the housing contains liquid it is necessary that the housing material be nonporous, nonabsorbent, and unreactive with respect to the liquid it is designed to contain. The housing is enclosed, and since the level sensing unit is designed to be insensitive to expansion and contraction of the buoyant liquid contained in the housing there is no need to access the reservoir to adjust the height of the liquid therein so that the housing may be permanently sealed. The liquid reservoir is the lower portion of the interior of the housing generally underneath the float (vide infra) and is generally designated as 2. The functional relationship of the reservoir and the liquid therein to the elements of the level sensing unit is more extensively described below.

Where the housing is box-like a front and back, a top and bottom, and two side walls are inherent. However, the shape of the housing is not an element of my invention, and it will be easily appreciated that the housing can be of any convenient shape without affecting its performance. If, for example, the housing is spherical the terms top, bottom, etc., have no reference relative to the shape of the housing itself. Yet it must be emphasized that such terms are meaningful with reference to the internal elements of the housing making up the level sensing unit which is my invention. In particular, the liquid reservoir is necessarily in the bottom portion of the housing; gravitational forces can be said to define "bottom." The description which follows is couched in terms relative to a box-shaped housing for ease of understanding, but always with the realization that the shape of the housing is substantially unrelated to, and not critical to, the success of the invention and that such descriptive terms are applicable to other housing shapes via the arrangement of the internal elements.

Figure 1:
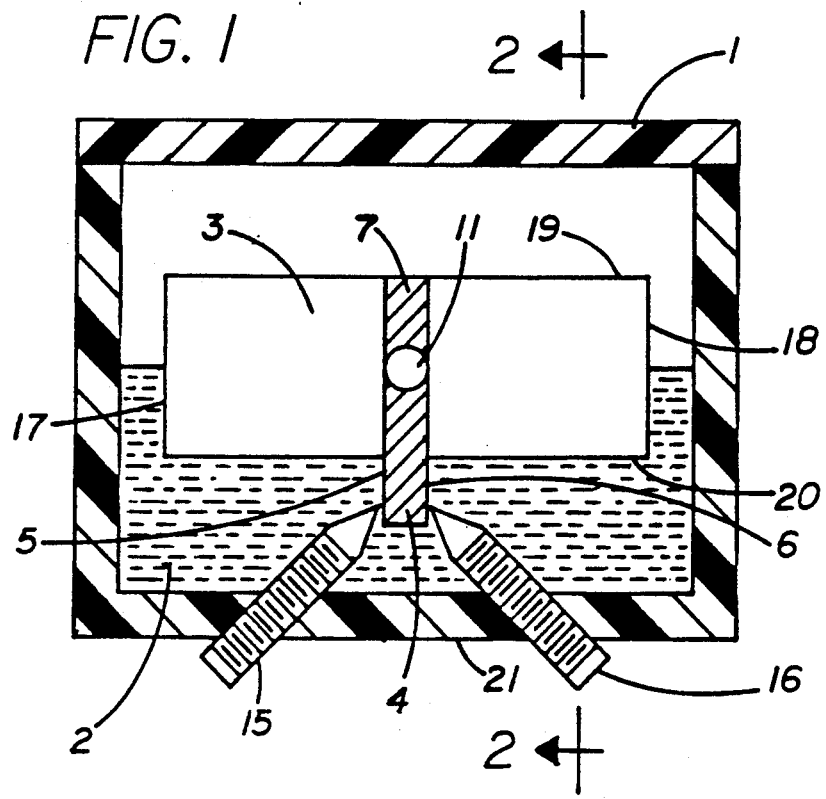
FIG. 1 is a front cross sectional view of one embodiment of a level sensing unit.
Figure 2:
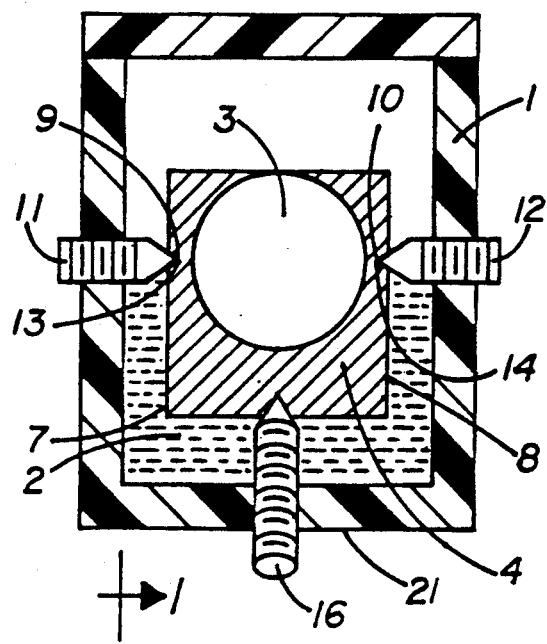
FIG. 2 is a view along 2—2 of FIG. 1.

Within the housing there is a member, 3, serving as a float, extending between the side walls and usually located in the upper portion of the housing. The float has two ends, 17 and 18, and a top and a bottom surface, 19 and 20, respectively, where "bottom" refers to that direction toward the liquid reservoir, and "top" refers to the direction away from the liquid reservoir. Although the float often is generally cylindrical for convenience, the required shape of the float is subject only to the requirement that the float be bilaterally symmetrical with respect to a plane which bisects and is normal to a line between the ends of the member. As FIG. 1 shows the float can be located approximately in the middle of the housing. In fact, the position of the float within the housing is not important to its proper operation. What is important is the relative position of the various elements of the liquid sensing unit within the housing. The float itself may be made of wood, of plastic, even of light metal. Most desirably the float is of low density so as to be maximally sensitive to the buoyant force of the liquid in the reservoir. Consequently the floats may be hollow as well as solid.

The float member 3 has an electrically conductive plate, 4, inserted so as to bisect the float between its ends, which is to say that the plate 4 will be located in the plane with respect to which the float shows bilateral symmetry. The plate is generally flat, although not necessarily so, and some part of the plate must extend outside, or beyond the surface, of the float member, i.e., placement of the plate wholly within the float member is an inoperative embodiment. For operative convenience and increased sensitivity, it is desirable that the plate extend above either the top surface, the bottom surface, or above both surfaces of the float. The electrically conducting plate has two opposing surfaces, 5 and 6, and two opposing edges, 7 and 8. Each of the edges has a recess, 9 and 10, generally conical, located thereon, whose purpose is to receive the pivot points of the pins embedded in the front and back walls of the housing, as described below. The recesses usually are located approximately midway between the top and bottom surfaces of the float member for maximum stability. However, placement of recesses in the edges of the upper portion of the plate also lends itself to a stable configuration, whereas placement of recesses in the edges of the lower portion of the plate tends to afford an unstable configuration.

A pin, 11, is embedded in the front wall of the housing and extends toward the back wall. The pin has a pivot point, 13, at its end terminating within the housing, and at least the surface of the pin is electrically conducting, although normally the pin is made of the same electrically conducting material throughout. A second pin, 12, also having a pivot point, 14, and with at least its surface electrically conducting is embedded in the back wall of the housing and extends toward the front wall. Because at least one of the pins is part of an electrical circuit, at least one pin usually extends through a wall to the exterior of the housing in order to facilitate electrical connections, although the alternative of making an electrical connection within the wall also is feasible.

The float with its electrically conductive plate is pivotally mounted on the pins, with the pivot points 13 and 14 pivotally engaged in the recesses 9 and 10 of the plate edges. Since the pins (and their pivot points) have at least an electrically conductive surface and are in physical contact with the electrically conductive plate in the float member, the pins and the electrically conductive plate also make good electrical contact and, in fact, form part of an electrical circuit as alluded to previously. In one embodiment the pins are collinearly aligned and the float member pivots about the axis defined by the pins. However, the foregoing arrangement is not a necessary requirement for the float member to pivot around an axis running from the front to the back walls, and other equivalent arrangements are within the scope of our claims.

There are two electrically conductive strips, 15 and 16, mounted between the front and back walls. Each strip has a first end embedded in a wall of the housing, and each strip has at least some part, which is the second end in a preferred embodiment, proximate or adjacent to, but not in contact with, the opposing surfaces of the plate. The plate is centrally located with respect to these electrically conductive strips so that when the float member is absolutely level each of the opposite surfaces of the plate is equidistant from the electrically conductive strip closest to the surface. The strips extend sufficiently into the interior of the housing as to enable physical and electrical contact with the opposing surfaces of the plate when the float rotates. A convenient arrangement is one where the conducting strips are aligned approximately coparallel to the long axis of the float, with the end of each strip terminating within the housing proximate to the opposing plate surfaces. There are virtually an infinite number of variants for the design and/or placement of the electrically conducting strips. The only necessary condition, and a sufficient condition as well, is that the strips be placed on either side of the surfaces of the electrically conductive plate with the same distance between each electrically conducting strip and the closest surface of the electrically conductive plate at a condition of level.

Figure 3:
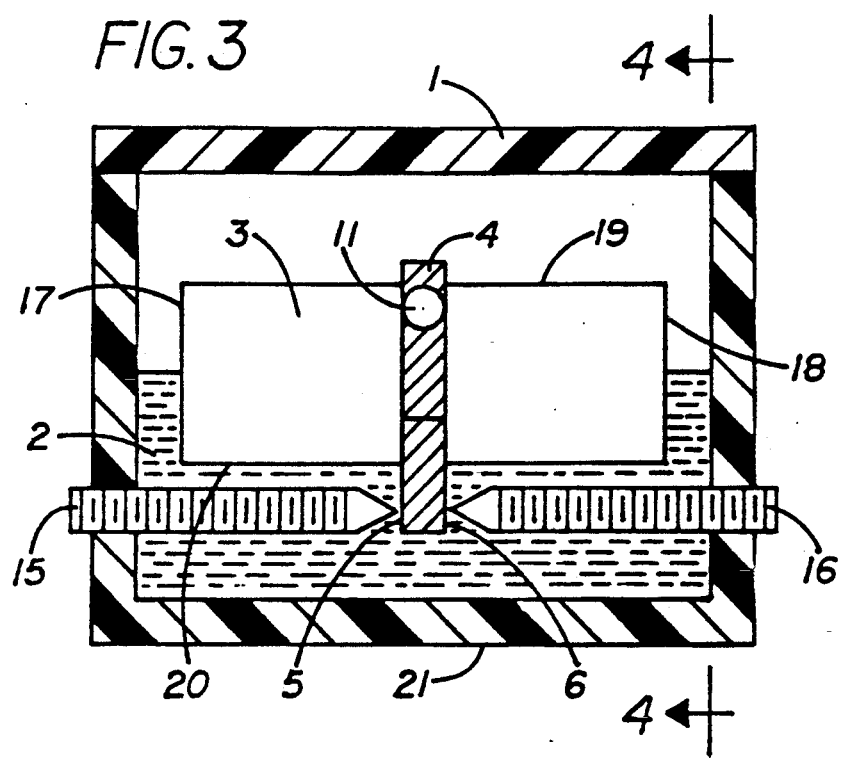
FIG. 3 is a front cross sectional view of another illustrative embodiment of a level sensing unit.
Figure 4:
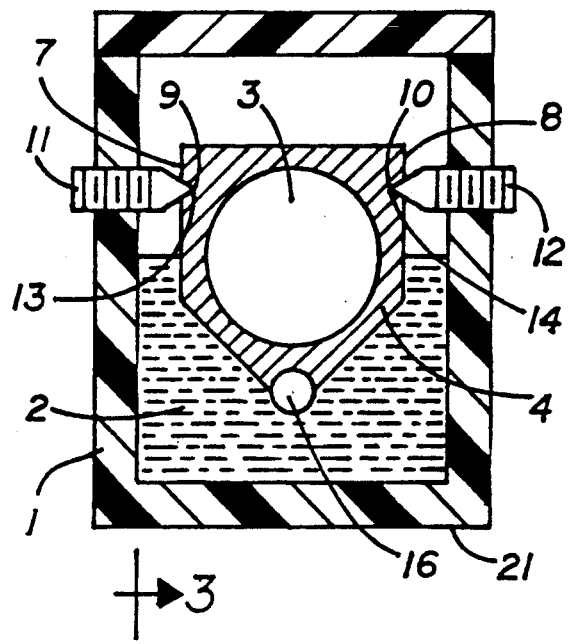
FIG. 4 is a view along 4—4 of FIG. 3.
Figure 5:
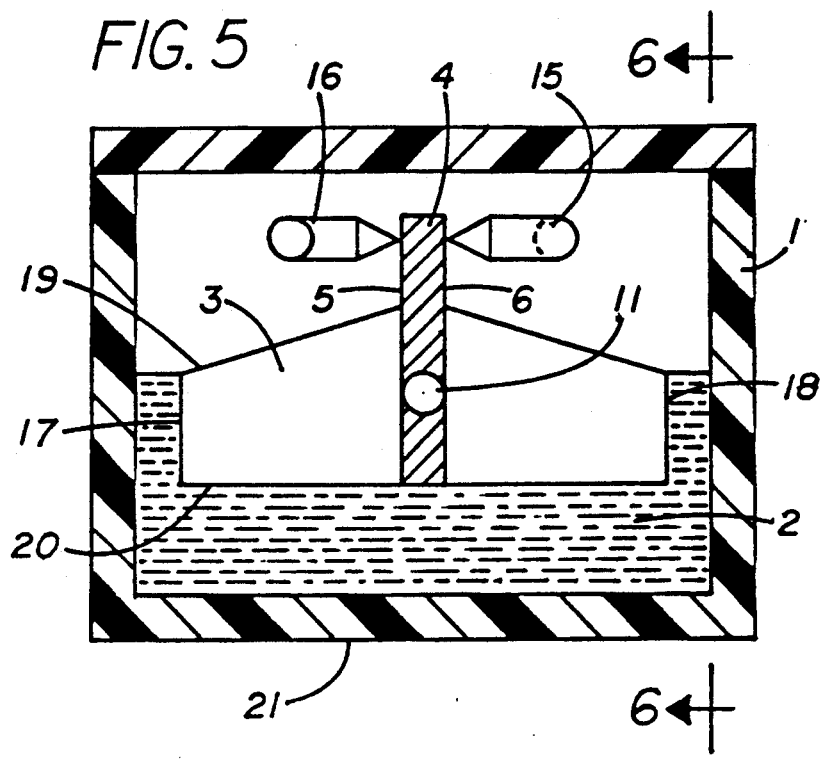
FIG. 5 is a front cross sectional view of a third illustrative embodiment of a level sensing unit.
Figure 6:
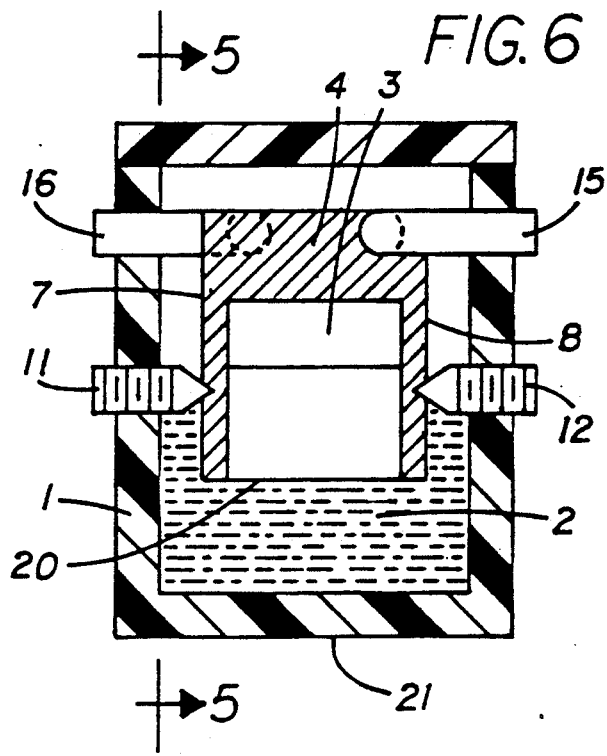
FIG. 6 is a view along 6—6 of FIG. 5.

For example, the electrically conducting strips may be placed between the back and the front walls, and although it may be most convenient to place them midway between the walls this is not a necessary condition. The electrically conducting strips may be embedded in the bottom of the housing, extending upwardly toward each of the opposing surfaces of the electrically conductive plate as shown in FIG. 1, or they may be embedded in the sidewalls extending toward each of the opposing surfaces of the conductive plate as depicted in FIG. 3, or embedded in the front and side walls as shown in FIG. 5, or even in the top wall as illustrated by FIG. 7. It will be appreciated that the level sensing unit is also completely functional if, for example, one electrically conductive strip is embedded in the side wall and the other is embedded in the bottom wall of the reservoir. It also will be recalled that the electrically conductive plate may extend above either the bottom surface of the float or the top surface of the float (or above both surfaces). In those cases where the plate extends above the top surface of the float, the conducting members can be placed in the upper portion of the housing, as is portrayed in FIGS. 5 and 7.

As previously stated, there are many variants possible for the level sensing unit of my invention. The electrically conducting plate 4 may be flat, but need not be. Although it perhaps is most convenient to have a rectangularly shaped plate, virtually any shape will suffice so long as the plate provides two opposing surfaces which are available for contact with the electrically conducting strips, 15 and 16, and have two opposing edges which can accommodate recesses in which the pivot points can be pivotally engaged. It needs to be clearly understood that the arrangement of the conducting strips relative to plate 4 is susceptible to a large number of variants, subject only to the condition that they be equidistant from and proximate to the plate opposing surfaces at a condition of level. For optimum sensitivity it is desirable that the plate extend beyond at least one of the top and bottom surfaces of the float, and that the pins be proximate to the plate nearest one of its extremities, that is, near the topmost or the lowest portion of the plate, depending upon which surface the plate extends beyond. FIGS. 3-8 exemplify some of the many variants possible, all of which are intended to be encompassed by my invention. The skilled worker will appreciate that the figures are only illustrative of some very few embodiments possible under my invention, and that other embodiments will become apparent from my description.

In one variant, the strips are generally cylindrical solids, one end of which is threaded and inserted into a matching threaded socket in a wall of the housing. It now is possible to vary the effective distance between the plate edges and the electrical strips by rotating the strips and moving them up or down within the threaded socket, thereby adjusting the sensitivity of the level sensing unit to angular deflection. Like the pins, at least one end of each conducting strip generally extends through the wall of the housing to its exterior to facilitate electrical connections.

The operation of my level sensing unit is perhaps best understood with respect to the bottom surface of the housing, 21, whose orientation can be changed. The reservoir contains liquid to a height generally covering no more than half of the float. When 21 is on a level surface, float 3 is coparallel to the horizon line and plate 4 is normal to it, with both surfaces of the plate, 5 and 6, equidistant from the electrical strips 15 and 16, that is, not in contact with either one. As the housing is rotated clockwise, the left hand portion of the bottom surface, 20, becomes higher than the right hand portion. However, the float remains coparallel to the horizon line and plate 4 remains normal to it, with the result that at some degree of rotation the plate surface, 6, on the right hand portion of the plate makes physical and electrical contact with the right hand strip, 16. Where the pivot pins, the plate, and the electrically conducting strip are part of an electric circuit, the circuit is closed upon contact of the strip and plate, but open otherwise. Conversely, upon counterclockwise rotation the right hand portion of the bottom surface 21 becomes higher than the left hand portion and the plate surface on the left hand portion of the plate, 5, makes physical and electrical contact with the left hand electrical strip, 15. In that variant where the electrical strip is a cylindrical solid fit into the housing so no leakage of fluid results while enabling the strip to be rotated, as by a slotted head, from the outside of the housing, such rotation effectively varies the distance between the edge of the flat plate and the electrical strip. This varies the sensitivity of the level sensing unit, that is, the angular deflection from level necessary to make electrical contact between an edge of the plate and its nearest electrical strip.

Many liquids may be used in the unit and are largely a matter of choice subject to some general requirements. The liquid must be unreactive with materials with which it comes into contact, must flow readily at the minimum operating temperatures contemplated, and should not have a high vapor pressure at maximum contemplated operating temperatures. The liquid needs to be nonconductive, and neither reactive with nor absorbed by the housing or any material it is likely to contact. The operation of the unit is relatively insensitive to the specific gravity of the liquid, which is therefore not a critical consideration.

Having described a level sensing unit in quite specific terms as a discrete embodiment, it is important to appreciate that my invention is a quite general one which encompasses an entire class of devices bound by common threads of symmetry properties. A generalized level sensing unit has an enclosed housing with a front and a back wall containing a reservoir for liquid which exerts a buoyant force on a float assembly which comprises a float member and a conducting member. The float member has two ends, front and back surfaces and top and bottom surfaces, and exhibits bilateral symmetry, with a mirror plane located normal to and bisecting a line joining the two ends of the float member, i.e., the float member (as well as the entire float assembly) has $C_s$ symmetry. There is a conducting member with two opposing surfaces and at least two opposing edges located in the mirror plane of the float member, and at least a portion of the conducting member extends beyond, or outside, the surface of the float member. The float assembly is pivotally mounted on pivot means, which often are in electrical contact with the conducting member, and the entire float assembly pivots about an axis which runs from the front to the back wall of the housing, which lies in the mirror plane of the float member, and which is, ideally, parallel to the surface of the liquid in the reservoir. The level sensing unit also contains two conducting strips within the interior of the housing, each with a first terminus embedded in a wall of the housing and each with some portion, which is usually the second terminus, adjacent to one of the opposing surfaces of the plate. Each strip is so placed that when the level sensing unit is at level with respect to the horizon the two parts of the strip adjacent to the plate (i.e., the second termini of the strips in the most usual case) are equidistant from the nearest plate surface. Since the two conducting strips and the conducting member are incorporated in some type of electrical circuit, there needs to be a provision for electrical contact with these elements. Electrical contact with the conducting plate frequently is made via the pivot means, as mentioned above, and the conducting strips often extend through the housing to facilitate electrical connections exterior to the level sensing unit. However, it will be appreciated that the specific manner of making the necessary electrical connections is mainly a matter of choice with a large universe of methods available to choose from.

Figure 9:
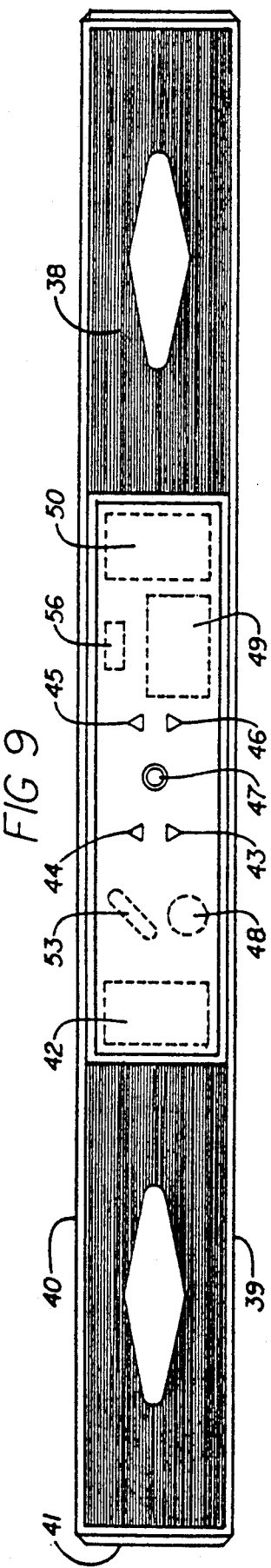
FIG. 9 is a front view of a level indicating device.

The design of a contractor's level incorporating two of the level sensing units described, so as to measure both the horizontal and vertical (plumb) level, is susceptible to a multitude of variants, and an embodiment is shown in FIG. 9. The level 38 has a generally rectangular, beam-like shape and incorporates two level sensing units oriented 90° relative to each other. If the surface 39 be designated as that side which is to be placed on the surface whose level is to be measured, the sides 40 and 41 will be the "top" when the level is used as a level and plumb device, resp. Thus the upper and lower surfaces, 40 and 39, resp., must be substantially parallel, and surface 41 and its opposed counterpart substantially perpendicular, to the lower surface. The level also contains a battery compartment, 42, for releasably containing batteries necessary to power an electrical circuit incorporating the level sensing unit, two sets of indicator lights, 43-46, conveniently grouped toward the middle to indicate deviations from level, an on-off switch, 47, and a tone generator, 48, such as a buzzer. Two level sensing units 49 and 50, which measure level and plumb, respectively, are at the nub of the level and are located internally and, arbitrarily in the drawing, on either side of the indicator lights. If the right hand level be designated as the plumb sensor, then it will be oriented by rotating FIG. 1 90° counterclockwise and the other level sensing unit will be oriented as in FIG. 1.

Figure 10:
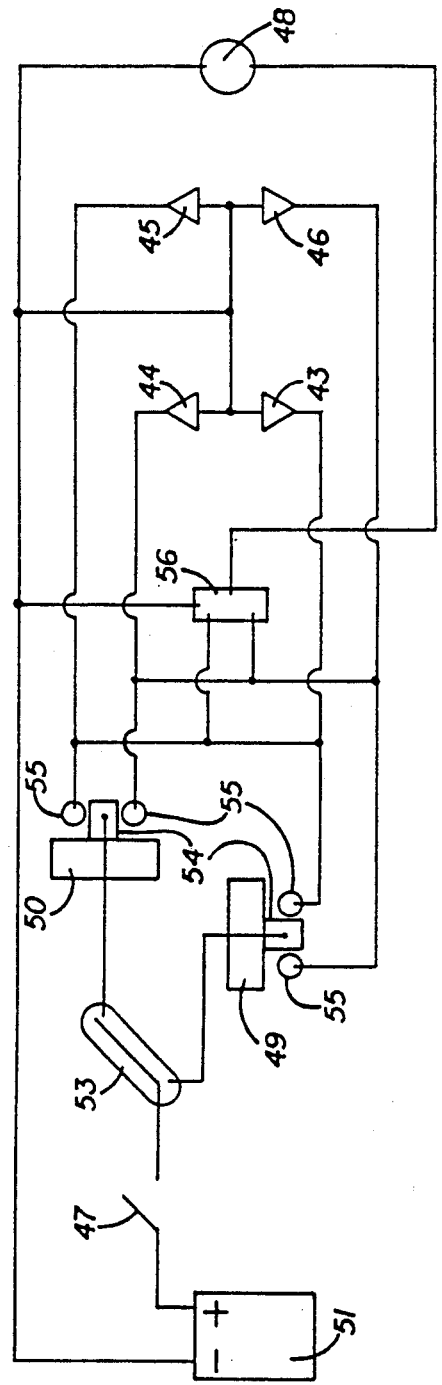
FIG. 10 is a circuit diagram of one simple circuit incorporating the level sensing units of this invention in a level indicating device.

The operation of the level may be better understood by referring to FIG. 10, which shows one of several simple circuits which may be incorporated into the level. A battery, 51, contained in the level's battery compartment supplies power and may be, for example, a simple 9 volt battery of the type commonly produced. Switch 47 is an on/off switch for the circuit. An optional mercury switch, 53, operative for both the level and plumb mode, may be incorporated to eliminate chatter. Both 54 and 55 are those portions of the level and plumb sensing units, resp., incorporated into the electrical circuit and are composed of the flat plate 4 and the conducting strips 15 and 16 on each side of the plate edges. A relay, 56, such as a 5 VDC relay, which is normally closed, a tone generator 48, and indicator lights 43-46 complete the essential elements of this simple circuit.

Where the device is used to measure level mercury switch 53 and level sensing unit 49 determine the state of the electrical circuit. Where the surface measured is not level and the left hand side is the higher one, the flat plate will close the circuit with conducting strip 16. Following the wiring diagram it can be seen that indicator lights 43 and 45 will be on. Since the relay is normally closed but will open upon completion of the circuit including the flat plate and either conducting strip, the tone generator will be silent. If the measuring surface is not level but the right hand side of the device is the higher one, the flat plate and conducting strip 15 will close the circuit, indicator lights 44 and will be on and the tone device again will be silent. Finally, if the surface measured is level neither conducting strip 15 nor 16 makes contact with the flat plate, all lights are off, the relay is closed, and a tone will sound. Thus, one using the level may place the device on a surface, change the orientation of the surface without looking at the level, and merely wait for the tone indicator to go on as a signal that a level status has been reached. By glancing at the status of the indicator lights the operator also will immediately know the direction of deviation from level and therefore know the direction in which corrections must be made.

When used to measure plumb the device operates similarly. Briefly, if the unit deviates from plumb in a direction corresponding to a clockwise orientation indicator lights 43 and 45 will be on; if the deviation corresponds to a counterclockwise rotation then lights 44 and 46 are on; and if there is exact plumb all the lights are off but the tone indicator generator will be on.

One skilled in the art will recognize that many combinations of the level sensing unit described herein, as well as many circuit variants, may be combined to give various embodiments of a contractor's level. All such embodiments are intended to be subsumed within the aforementioned description.

What is claimed is:

1. A level sensing unit comprising a sealed housing with a front and back wall, a top and bottom wall, two side walls, and containing a fluid reservoir;
   a first pin with a first pivot point and an electrically conductive surface connected to the front wall and extending toward the back wall;
   a second pin with a second pivot point and an electrically conductive surface connected to the back wall and extending toward the front wall in a direction collinear with the first pin;
   a generally cylindrical float, with a top and bottom surface and two ends, having an electrically conductive plate approximately bisecting said float between its ends and extending beyond at least one of the top and bottom surfaces, said plate having opposing first and second surfaces, first and second opposing edges, and a first and second recess located on the opposing edges and receivably disposed for the first and second pivot points, respectively;
   said float pivotally mounted on, and in electrical contact with, the first and second pins with the first and second pivot points pivotally engaged in the first and second recess, respectively;
   a first electrically conductive strip having a first and a second end, said first end embedded in any one of the walls of the housing with said second end terminating within the housing, and with at least some portion of the electrically conductive strip proximate to the first surface of the plate; and
   a second electrically conductive strip having a first and a second end, said first end embedded in any one of the walls of the housing with said second end terminating within the housing, and with at least some portion of the second electrically conductive strip proximate to the second surface of the plate.

2. The level sensing unit of claim 1 where the first and second electrically conducting strips are approximately coparallel to the long axis of the float.

3. The level sensing unit of claim 1 where the portion of each of the electrically conductive strips proximate to the opposing plate surfaces is the second end of said strips.

4. The level sensing unit of claim 1 where the conductive plate extends below the bottom surface of the float and the electrically conductive strips are mounted beneath the bottom surface of, and coparallel to the long axis of, the float.

5. The level sensing unit of claim 1 where the conductive plate extends above the top surface of the float and the electrically conductive strips are mounted above the top surface of, and coparallel to the long axis of, the float.

6. A level sensing unit comprising an enclosed housing with a front and a back wall and containing a fluid reservoir, a float assembly having $C_s$ symmetry and a pair of electrically conducting strips;
   the float assembly comprising a float member and at least one conducting member, said float member having two ends, a front and a back surface, top and bottom surfaces, and a mirror plane bisecting and normal to a line joining said ends, said conducting member having first and second opposing surfaces, having at least two opposing edges, and being located in said mirror plane with at least a portion of the conducting member extending beyond the surface of the float member;
   the float assembly pivotally mounted on pivot means in electrical contact with the conducting member and pivoting about an axis directed from the front to the back wall of the housing and lying in the mirror plane of the float member;
   one constituent of the pair of electrically conducting strips having at least a portion adjacent to the first opposing surface of the conducting member; and
   the other constituent of the pair of electrically conducting strips having at least a portion adjacent to the second opposing surface of the conducting member.

7. The level sensing unit of claim 6 where the pivot means are a first pin embedded in the front wall and ending in a first pivot point, a second pin ending in a second pivot point and collinear with said first pin, said first and second pivot points pivotally engaged in a first and second recess located in the opposing edges of said conducting member.

* * * * *